United States Patent
Rana (10) Patent No.: US 7,587,669 B2
(45) Date of Patent: Sep. 8, 2009

(54) SERVER-BASED BROWSER SYSTEM

(75) Inventor: Ahad Rana, Irvine, CA (US)

(73) Assignee: AOL LLC, Dulles, VA (US)

( * ) Notice: Subject to any disclaimer, the term of this patent is extended or adjusted under 35 U.S.C. 154(b) by 682 days.

(21) Appl. No.: 10/474,300

(22) PCT Filed: Apr. 9, 2002

(86) PCT No.: PCT/US02/11420

§ 371 (c)(1),
(2), (4) Date: Apr. 16, 2004

(87) PCT Pub. No.: WO02/082229

PCT Pub. Date: Oct. 17, 2002

(65) Prior Publication Data

US 2005/0027823 A1 Feb. 3, 2005

(51) Int. Cl.
G06F 17/27 (2006.01)
(52) U.S. Cl. .................. 715/242; 715/234; 709/247
(58) Field of Classification Search .......... 709/247; 715/236, 238, 239, 242, 234
See application file for complete search history.

(56) References Cited

U.S. PATENT DOCUMENTS

| | | | |
|---|---|---|---|
| 6,023,714 A | 2/2000 | Hill et al. | |
| 6,125,391 A | 9/2000 | Meltzer et al. | |
| 6,154,771 A | 11/2000 | Rangan et al. | |
| 6,175,842 B1 | 1/2001 | Kirk et al. | |
| 6,430,624 B1 * | 8/2002 | Jamtgaard et al. | 709/246 |
| 6,477,549 B1 * | 11/2002 | Hishida et al. | 715/513 |
| 6,829,746 B1 * | 12/2004 | Schwerdtfeger et al. | 715/523 |
| 6,883,137 B1 * | 4/2005 | Girardot et al. | 715/242 |
| 6,941,382 B1 * | 9/2005 | Tuli | 709/247 |
| 2002/0016801 A1 * | 2/2002 | Reiley et al. | 707/523 |
| 2002/0030844 A1 * | 3/2002 | Tuli | 358/1.15 |

* cited by examiner

Primary Examiner—Dustin Nguyen
Assistant Examiner—Michael E Keefer
(74) Attorney, Agent, or Firm—Michael A. Glenn; Glenn Patent Group (57) ABSTRACT

A server-based browser system provides a server-based browser and a client system browser. The client browser reports the position of a user click on its display screen, hotspot ID, or URL to the server-side browser which retrieves a Document Object Model (DOM) model and view tree for the client and finds the location on the Web page that the user clicked on using the coordinates or hotspot ID received from the client. If there is a script associated with the location, it is executed and the resulting page location is requested from the appropriate server. If there is a URL associated with the location, it is requested from the appropriate server. The response Web page HTML definition is parsed and a DOM tree model is created which is used to create a view tree model. The server-side browser retrieves a style sheet, layout algorithms, and device constraints for the client device and lays out the view model using them onto a virtual page and determines the visual content. Textual and positional information are highly compressed and formatted into a stream and sent to the client browser which decodes the stream and displays the page to the user using the textual and positional information.

33 Claims, 8 Drawing Sheets

SERVER-BASED BROWSER SYSTEM

BACKGROUND OF THE INVENTION

1. Technical Field

The invention relates to Web browsing technology. More particularly, the invention relates to a system and method for fast delivery of and fast rendering of Web pages on a lightweight network device.

2. Description of the Prior Art

A typical Web page today contains not only HTML content but also, by reference to, other content elements such as graphics and external style sheets. A browser acquires the referenced content elements by spawning worker threads that retrieve the data via multiple HTTP-TCP/IP connections. This model works well for desktop systems containing large amounts of processing power and RAM. However, it is usually not feasible for mobile, lightweight, embedded devices in which processing power and RAM are much limited.

The process for proper HTML parsing, validation, and layout code is normally quite complex and requires large amount of CPU and RAM to execute. Size and manufacturing cost have been major concerns in providing embedded devices with a capacity to implement the process. Although embedded devices are getting more and more processing power and RAM, the requirements of a proper browser engine still outdistance the resources available to even the highest end of embedded devices.

High levels of CPU usage are detrimental to the preservation of battery life, which is a very important consideration for today's mobile devices. Heavy loads in HTTP communications, HTML parsing, HTML validation and layout may largely shorten the battery life.

Bandwidth usage is also a major constraint that must be considered in designing a browser model for embedded devices. Text based HTML content, although compressible, is already quite large with respect to the limited transmission speed of today's wireless networks. When image content designed for higher resolution and larger form factor display is included, one may quickly end up consuming a lot of wasted bandwidth transmitting redundant, not necessarily usable data to mobile devices.

Although various browsing technologies have been already presented in the marketplace, many of them fail to meet the tight constraints and stringent requirements of the embedded devices. Writing a cross platform code base for these devices is an even bigger challenge, given the multitude of operating systems, memory models and processors available for embedded device manufacturers.

It would be advantageous to provide a server-based browser system that offloads heavy weight components of a traditional browser to a back end server. It would further be advantageous to provide a server-based browser system that leaves a lightweight client device with a minimal task of implementing a customizable interface to display a pre-rendered representation of Web pages.

SUMMARY OF THE INVENTION

The invention provides a server-based browser system. The system offloads heavy weight components of a traditional browser to a back end server. In addition, the invention leaves a lightweight client device with a minimal task of implementing a customizable interface to display a pre-rendered representation of Web pages.

A preferred embodiment of the invention provides a server-based browser and a client system browser. The client browser determines the position of a user click on its display screen and sends a navigation request containing the coordinates of the click or a hotspot ID, to the server-side browser. The client browser will also accept a specific URL from a user and places the URL in the navigation request.

The server-side browser retrieves a Document Object Model (DOM) model and view tree from a storage device for the client It then finds the location on the Web page that the user clicked on using the coordinates or hotspot ID received from the client. If there is a script associated with the location, it is executed and the resulting page location is requested from the appropriate server. If there is a URL associated with the location, it is requested from the appropriate server.

The response Web page HTML page definition is parsed and a DOM tree model is created. The server-side browser uses the DOM tree and creates a two-dimensional view tree model, and stores both trees on the storage device.

The server-side browser retrieves a style sheet, layout algorithms, and device constraints for the client device from the storage device. It lays out the view model using the style sheet, layout algorithms, and device constraints onto a virtual page.

If the client browser is a subset of the server-side browser engine, then the DOM tree and view tree are compressed into a stream and sent to the client browser which decodes the stream, translates the DOM tree and view tree, and displays the page to the user.

Otherwise, the server-side browser determines the visual content on the virtual page and the location of the visual content. Visual content and positional information are highly compressed and formatted into a stream and sent to the client browser which decodes the stream and displays the page to the user using the visual content and positional information.

The DOM tree and view tree and all state information (including Javascripts and cookies) for the client are stored on the storage device by the server-side browser.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a server-based browser system. A system according to the invention offloads heavy weight components of a traditional browser to a back end server. In addition, the invention provides a server-based browser system that leaves a lightweight client device with a minimal task of implementing a customizable interface to display a pre-rendered representation of Web pages.

A typical desktop browser requires a large amount of processor time to handle the load of obtaining Web page information and parsing the HTML code in the page. Secondary requests within the HTML code also require a large amount of processing time. Simple client devices such as PDAs, cellphones, and low CPU power set top boxes cannot handle the amount of processing power required to perform typical Web browsing.

Additionally, bandwidth on devices such as cellphones are limited and are charged to the user on a byte basis. This means that the large data transfers involved in typical Web browsing are too expensive in terms of bandwidth limitations and cost to the user.

Figure 1:
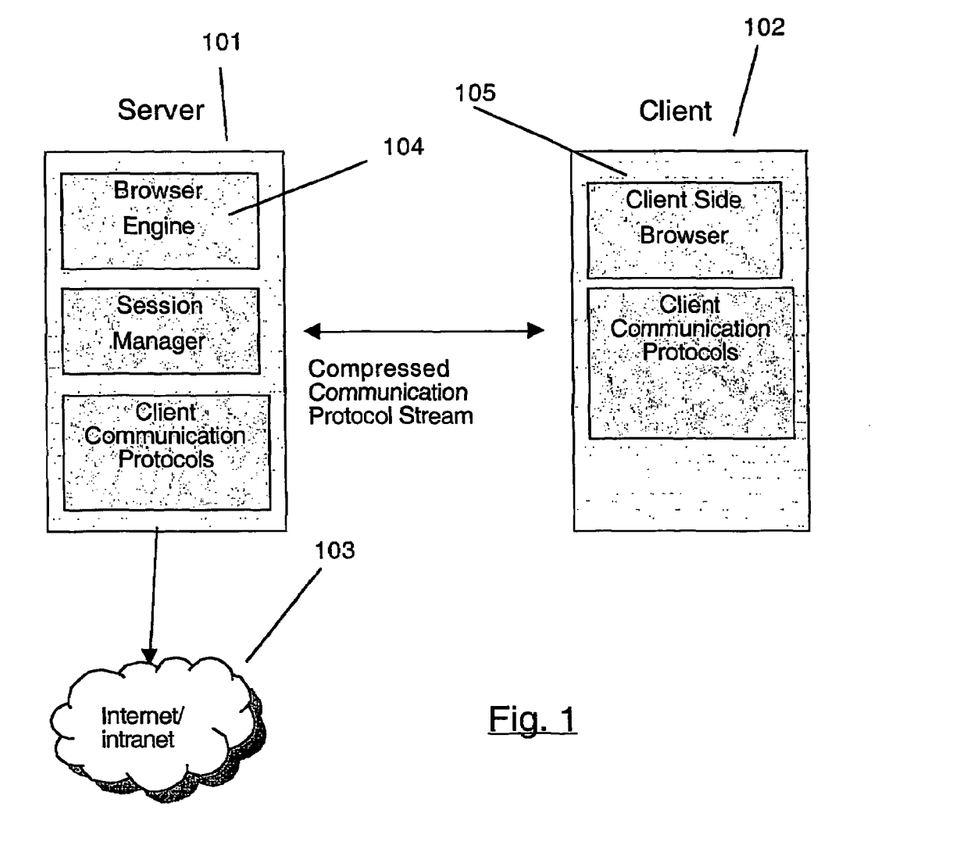
FIG. 1 is a block schematic diagram of a preferred embodiment of the invention showing a server-side browser and a client browser according to the invention.

Referring to FIG. 1, the invention provides a server-based 101 browser 104 that converts Web pages to a minimal format adaptable to different types of wired/wireless client devices such as cellphones, PDAs, and set top TV boxes. A light weight browser 105 is provided on a client device 102 to accept highly compressed streams of data from the server-side browser 104. The server-side browser 104 accesses information across the Internet or intranet 103.

Figure 2:
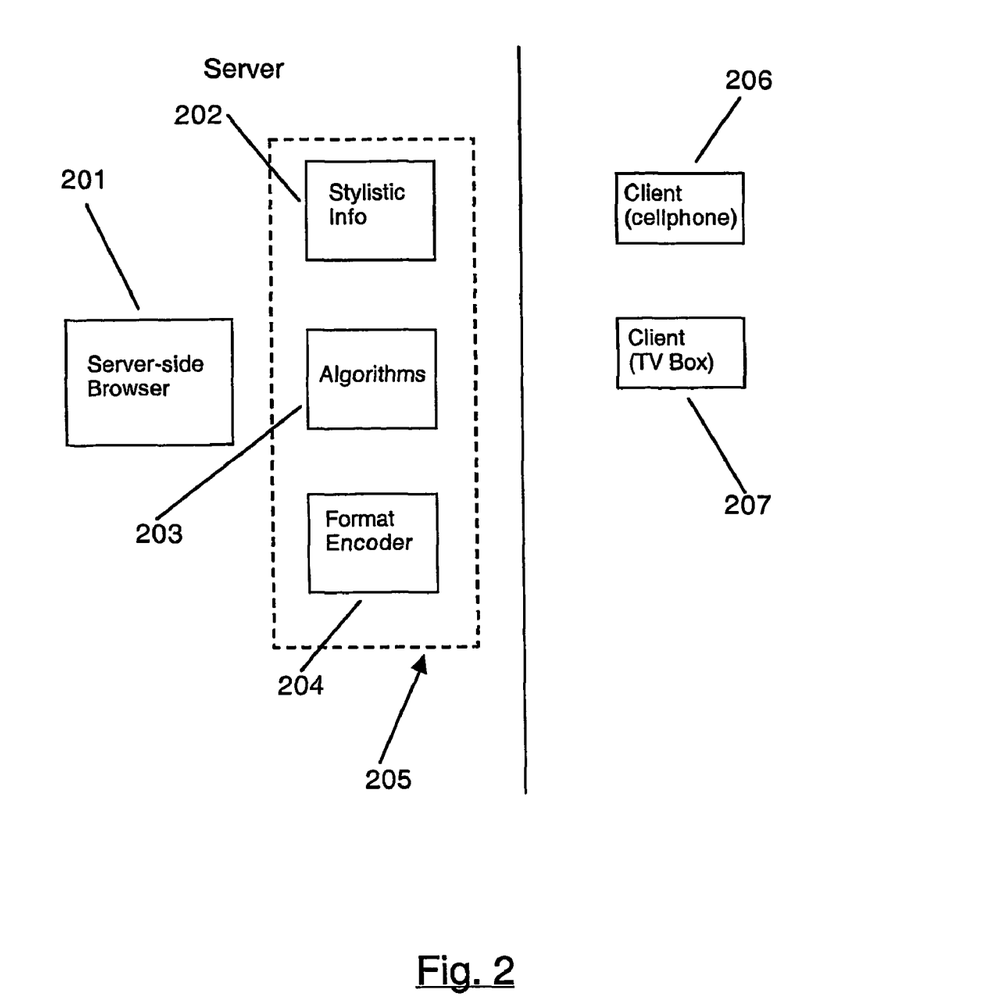
FIG. 2 is a block schematic diagram of a server-side browser and renderer and client device according to the invention.

With respect to FIG. 2, a user using a client device 206, 207 requests a Web page from a light weight browser or the light weight browser itself requests a Web page. The request is sent from the client 206, 207 to a server-side browser 201. The server-side browser 201 identifies the Web page that the user requested and sends a request to the proper server across the Internet or intranet.

When the requested Web page is returned to the server-side browser 201, the server-side browser 201 loads the initial HTML document. The received HTML document consists of text, which comprises the content of the document, and tags, which define the structure and appearance of the document. The server-side browser 201 looks at any dependencies within the document (e.g., referenced images, Javascript files that need to be loaded remotely, etc.) and opens multiple sockets to get the required information across the Internet or intranet.

The server-side browser 201 gathers the Web page information and lays out the information to calculate how to display the information on a particular device. The server-side browser 201 makes a second pass at the layout information and then transcodes the information into a very tight data stream that can be represented on the client 206, 207. The stream includes positional information that is not present in the normal HTML for the Web page.

The server-side browser 201 takes all of the HTML information for a Web page and represents it as two dimensional content on the server. This two-dimensional representation helps the browser determine the exact position information positional information for all of the pieces of a particular HTML Web page. If there are any images or other dependencies, the server-side browser 201 scales (or crops) the images down and/or preprocesses the images (e.g., reduce the bit depth of an image, dither the image, etc.) to match the capabilities of the client 206, 207. The browser then creates a compressed stream that is sent down to the client. This compressed stream contains text and images with exact positional information (that tells where the pieces of content fit on the page), and hot spot information. The browser maps each rectangular hotspot region to a related URL. Thus, no extraneous information, such as hyperlink URLs, or Cookie Data is sent down to the client.

The server-side browser 205 uses device characteristics information 202 for each supported device type, consisting of the associated default CSS style sheet, a list of supported fonts and their text metrics, device aspect ratios, pixel depth, color palette, form control dimensions, preferred layout algorithms, a DTD specifying level of HTML compliance, JavaScript policies, the User-Agent String to represent to a Web Server, and the compressed stream format encoder, to properly determine the ideal representation of Web content on the device. Various examples of potential clients with vastly different device characteristics could include: a cellphone 206 with a minimal CPU and minimal RAM; a PDA client with a small display but powerful CPU and high RAM; or a TV box 207 with a large display, high capacity CPU, low RAM, and non TCP/IP based communications. The server-side browser 205 utilizes many different layout algorithms to properly render information with these various classes of clients that all have different: display, CPU, RAM, and IO constraints.

A lightweight client browser is provided on the clients 206, 207 that accepts a standard information format from the server-side browser 201 and displays the data streams. This means that the server-side browser 201 can be updated at any time without affecting the clients 206, 207.

Figure 3:
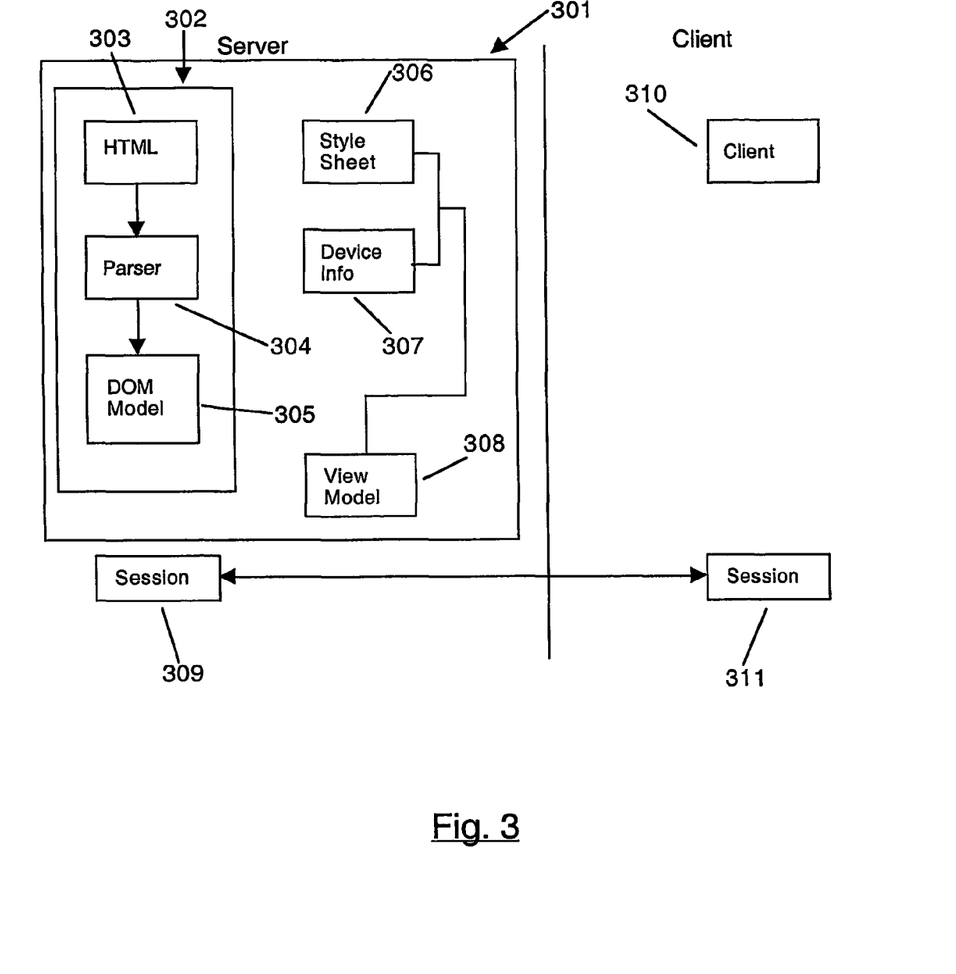
FIG. 3 is a block schematic diagram of a server-side browser engine and client device according to the invention.
Figure 4:
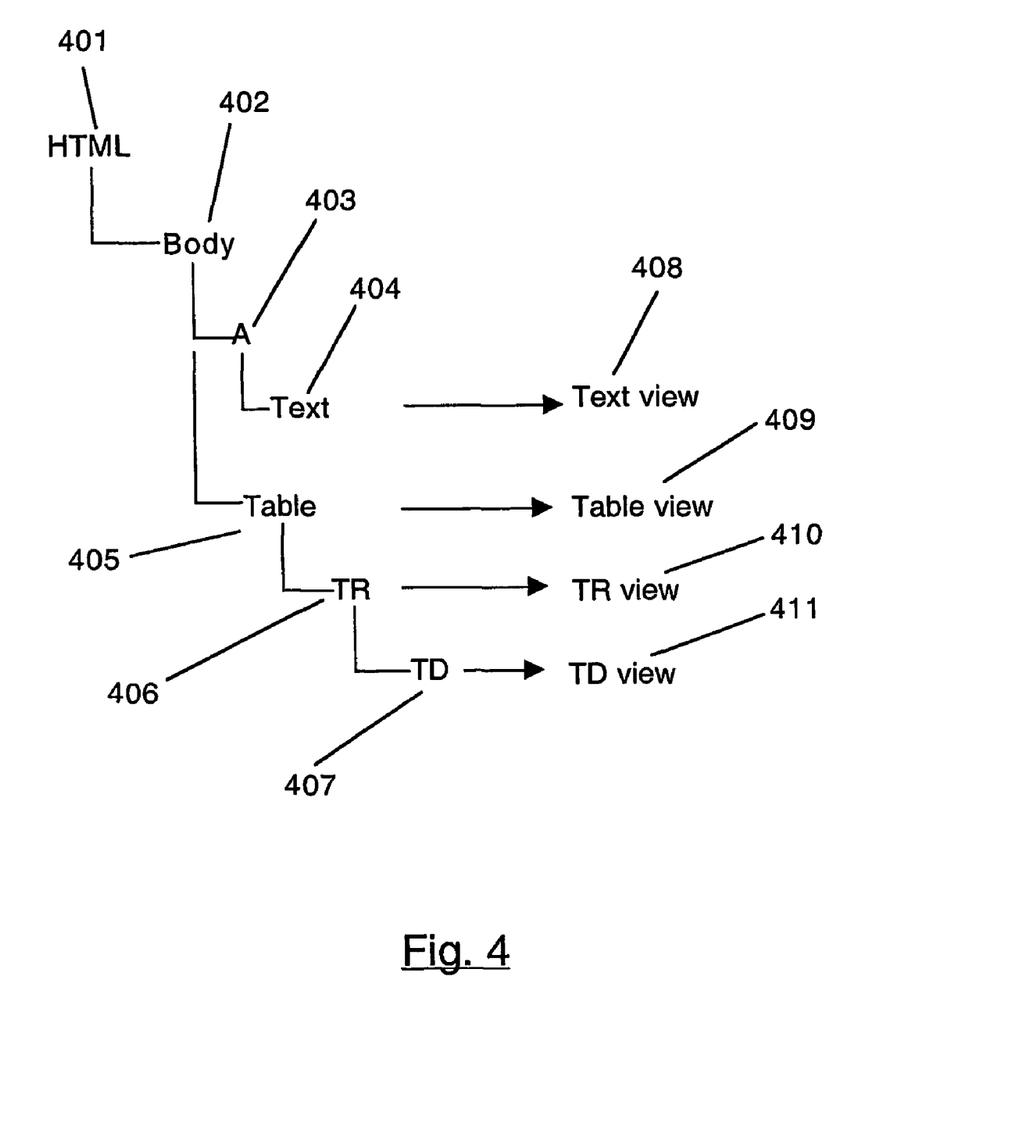
FIG. 4 is a block schematic diagram showing an HTML document tree according to the invention.
Figure 5:
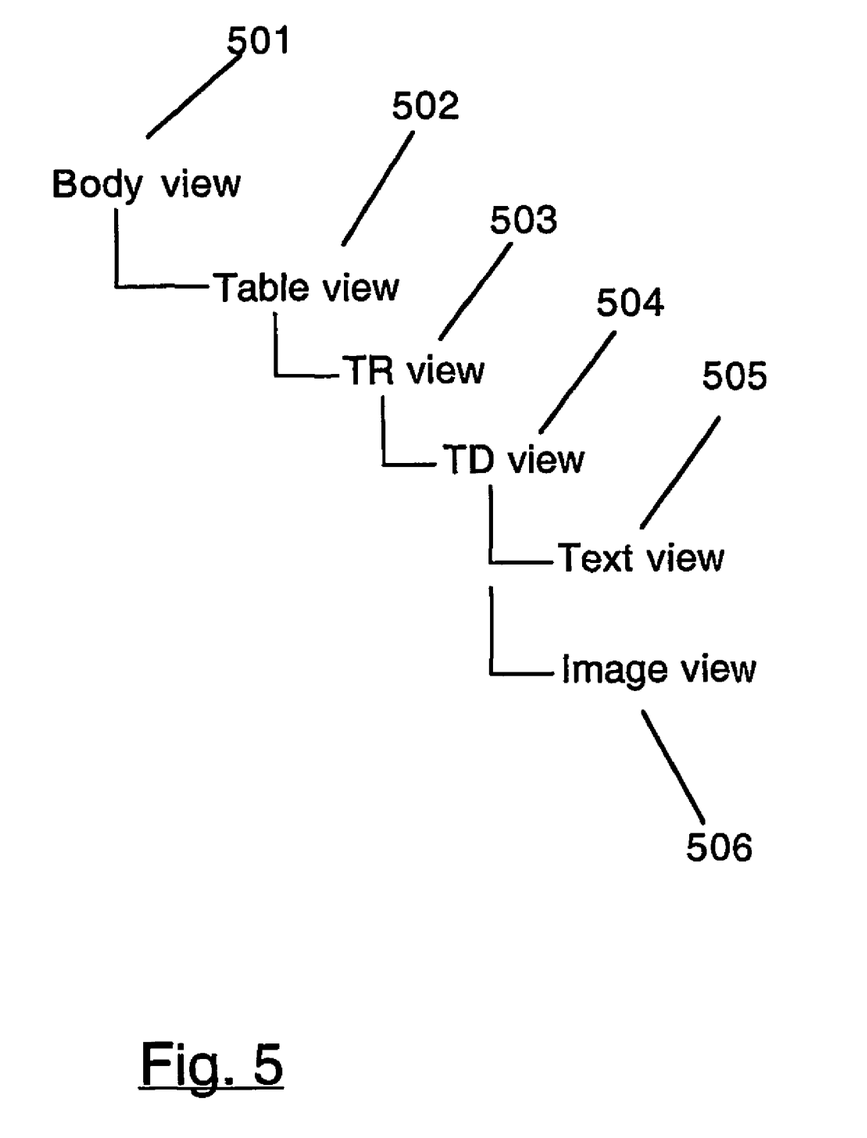
FIG. 5 is a block schematic diagram showing a view tree according to the invention.

Referring to FIGS. 3, 4, and 5, a preferred embodiment of the invention provides a server-side browser engine 302 that accepts HTML (e.g., HTML 4.0 content with support for CSS version 1) pages 303 and parses the HTML 304. The parser 304 creates a Document Object Model (DOM) object hierarchy model 305. The DOM model 305 is a tree representation of the HTML in the Web page, which is well known in the art.

A style sheet 306 tells the server-side browser 301 what fonts to use for standard HTML tags (e.g., bold), border sizes, and other stylistic information for each supported client device. A device information file 307 is also used by the browser that tells the server-side browser 301 the limitations of a client device (e.g., the size of a text control, fonts available, aspect ratio, etc.). The server-side browser 301 discovers what device type the client is when the client signs onto the server.

Using the style sheet 306 and the device information 307 for the particular device, the server-side browser 301 creates a view tree 308 which is a two-dimensional model of the parent-child relationship between viewable objects of the DOM model 305.

A DOM tree is shown in FIG. 4. The HTML 401 is the root of the tree and underneath has a Body tag 402. Under the Body tag 402 is an Anchor tag 403 which has Text 404 underneath. There is also a Table 405 beneath the Anchor tag 403. The Table 405 has a row 406 which has a cell 407. The browser makes views of DOM tree elements that are visible. For example, a Text view 408 is made of the Text 404, a Table view 409 is made of the Table 405, a TR view 410 is made of the row 406, and a TD view 411 is made of the cell 407.

An exemplary view model is shown in FIG. 5, where a Body view 501 is the root of the tree. A Table view 502 sits below the Body view 501 and has a TR view 503 below it. A TD view 504 is below the TR view 503. The TR view 504 has both a text view 505 and an image view 506 below it.

The server-side browser 301 then lays out the view model 308 on a virtual page. Each view in the view model 308 has a rectangular area of information attached to it. The server-side browser 301 lays out the views using specific layout algorithms for each view (e.g., tables, block levels, etc.) and uses the style sheet 306 and device information 307 for the particular device to make sure that any special characteristics or behaviors of the device are taken into account For example, for a TV box client, there may be a fixed table width defined in the view and fixed table widths are ignored by the TV box, or, one pixel width table borders are only supported on the TV box client. An example of a layout algorithm is every cell in a table is considered a row in itself, for a certain device each cell is to be laid out vertically instead of the normal horizontal layout.

Figure 6:
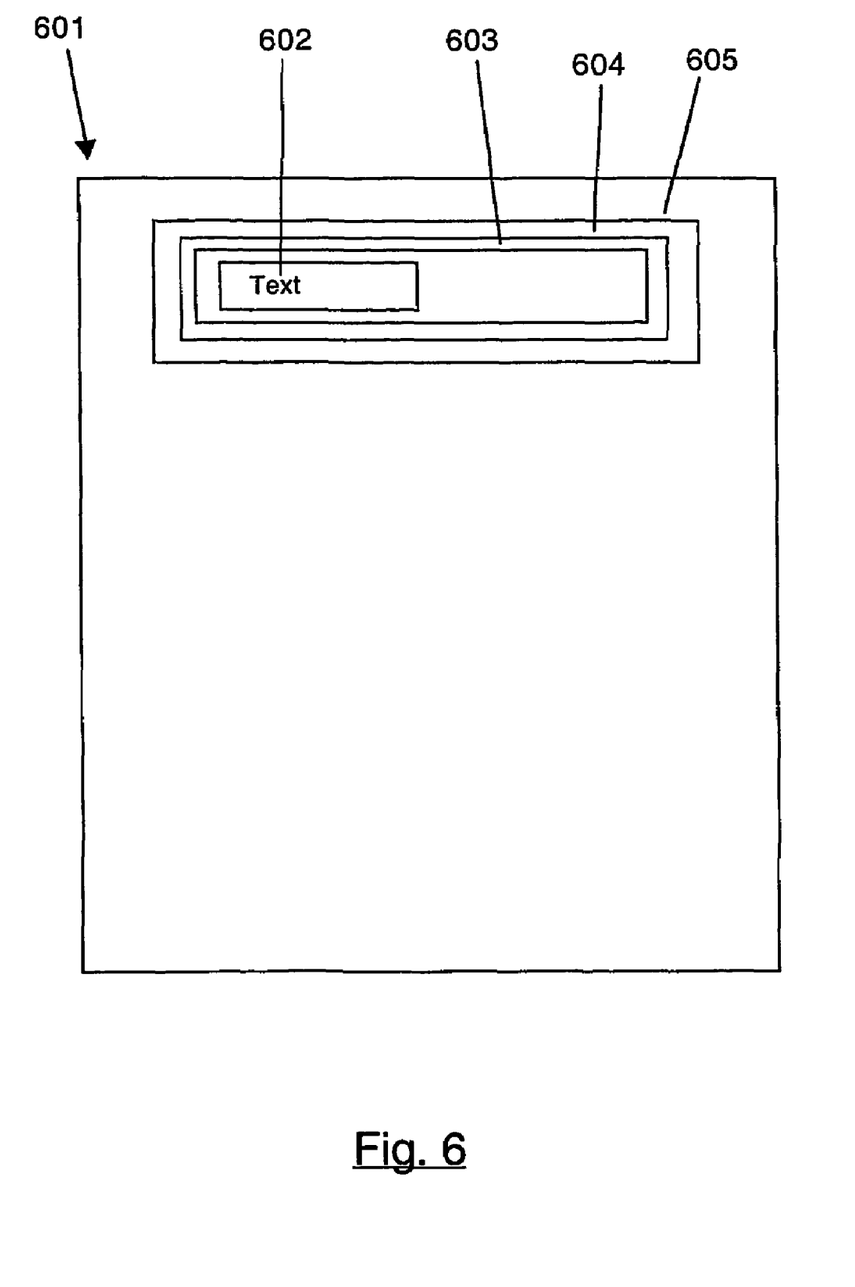
FIG. 6 is a block schematic diagram of a view layout of a Web page according to the invention.

With respect to FIG. 6, the server-side browser performs the first layout pass which lays out all of the views of the page 601. The page 601 is a virtual view of how the page looks. In this example, a body view 605 has a table view 604 within it. The Table view 604 has a row 603 which has a cell with text in it 602. Each view has a rectangular area that it represents and a parent-child relationship. This allows the server-side browser to walk through the viewable area to see what it represents.

A second pass is made to determine what the real content is on the page. HTML authors often define multiply nested tables to constrain a layout of an HTML page. The server-side browser throws away the unnecessary information that does not contribute to the appearance of the page (e.g., not renderable). The server-side browser is concerned with the physical positioning of content elements within the page. For example, the browser finds text 602 on the page 601 and accumulates the text into a string and compresses it to send to the client. The server-side browser also sends the client information that tells the client where the text should be displayed in its viewing area. This information is placed in a binary format that the client device feeds into.

The DOM tree and view tree and all state information (including Javascripts) for the client are preserved on the server. This is to ensure that, when the user is interacting with a page on the client, the server-side browser knows where the user has clicked on the page. The server-side browser does not send URL links to the client. This means that the client only has positional or hotspot information relating to where the user clicked or pressed on the page and sends that coordinate or hotspot information to the server-side browser. The server-side browser looks at the DOM tree and view model to find where the coordinates map onto the page. The view model is used to find the location of the coordinates or hotspot ID and the DOM tree is used to find the URL or script associated with the clicked area. When the server-side browser finds the area that corresponds to location where the user clicked, the server-side browser executes whatever script or URL request that corresponds with the area. The server-side browser then updates the client with the new page if the action was navigational, for example.

Cookie data are impractical to place on the client device. The server-side browser caches all of the user's cookies in a user state that the server-side browser preserves on the server for each user.

A session object exists on both the server and the client The session protocol is used by the client and server to communicate information. For example, when the client first signs onto the server, it tells the server its configuration information and other information. The server-side browser looks into its database and finds the client device's style and device information.

Figure 7:
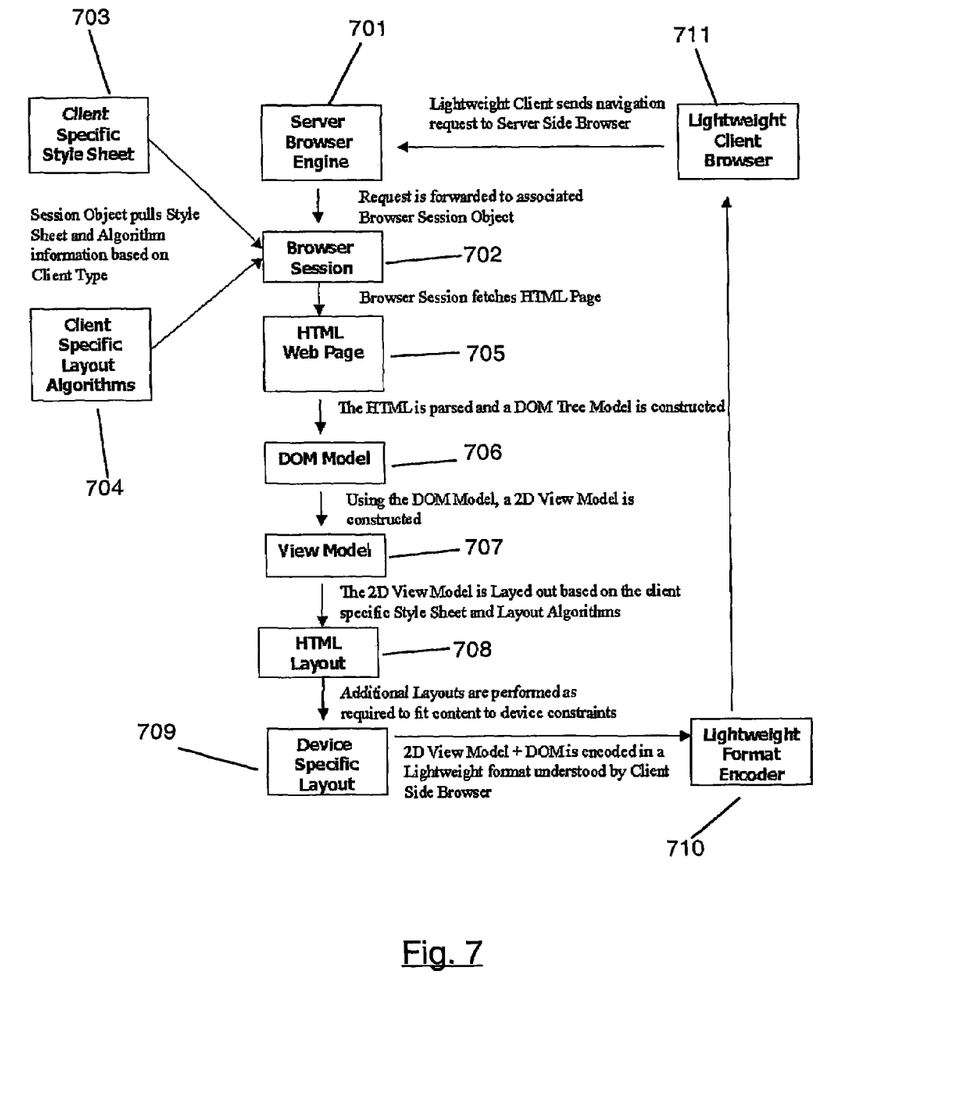
FIG. 7 is a block schematic diagram of a flowchart of an embodiment of the invention according to the invention.

Referring to FIG. 7, a flowchart of an another preferred embodiment of the invention is shown. The client browser 711 sends a navigation request to the server-side browser engine 701. The browser session 702 retrieves the client specific style sheet 703 and layout algorithms 704.

The browser session 702 fetches the requested Web page from the Internet or intranet. The HTML Web page 705 is parsed and a DOM tree model is created 706. The DOM tree model is then used to create a two-dimensional view tree model 707.

The invention lays out the view tree based on the client specific style sheet and layout algorithms 708. Any additional layouts are performed on the view tree to fit the client device constraints 709. The resulting two-dimensional view tree and DOM tree are encoded in a lightweight format and sent to the client which decodes the format 710 and displays the resulting page to the user through the client browser 711.

Figure 8:
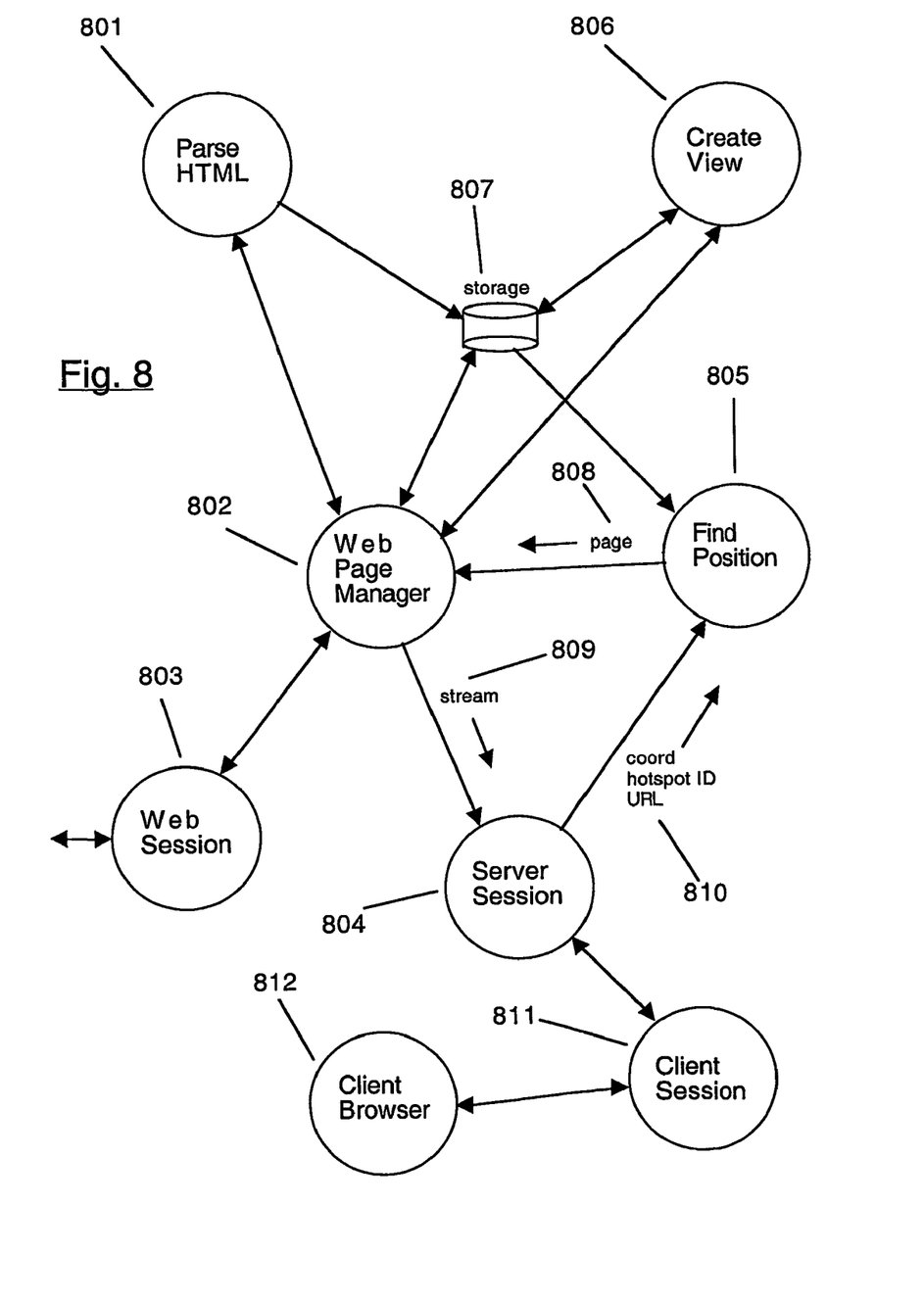
FIG. 8 is a block schematic diagram of a task viewpoint of a preferred embodiment of the invention according to the invention.

With respect to FIG. 8, a task viewpoint of the invention is shown. The Client Browser module 812 determines the position of a user click or press on its display screen and sends a navigation request containing the coordinates of the click or press, or the hotspot ID, to the server-side browser through the Client Session module 811 to the Server Session module 804. The Client Browser module 812 will also accept a specific URL from a user and places the URL in the navigation request. The Server Session module 804 forwards the navigation request to the Find Position module 805. The Find Position module 805 accepts Specific URLs from the client, coordinates of a user's click or press, and hotspot IDs 810.

The Find Position module 805 forwards any specific URL to the Web Page Manager 902. Otherwise, the Find Position module 805 retrieves the DOM model and view tree from the storage device 807 for the particular client, It then finds the location on the Web page that the user clicked or pressed on using the coordinates or hotspot ID received from the client. If there is a script associated with the location, it is executed and the resulting page location is sent to the Web Page Manager 802. If there is a URL associated with the location, it is forwarded to the Web Page Manager 802.

The Web Page Manager 802 receives the URL from the Find Position module 805 and formats a request for the Web page. The request is sent to the Web Session module 803. The Web page is returned to the Web Session module 803 and is forwarded to the Web Page Manager 802.

The Web page Manager 802 forwards the HTML Web page definition to the Parse HTML module 801. The Parse HTML module 801 parses the HTML and creates a DOM tree model which it stores on the storage device 807.

The Web page Manager 802 then activates the Create View module 806. The Create View module 806 uses the DOM model stored on the storage device 807, creates a two-dimensional view tree model, and stores it on the storage device 807.

Once the view tree is completed, the Web page Manager 802 retrieves the style sheet, layout algorithms, and device constraints for the specific client device are retrieved from the storage device 807. The Web page Manager 802 lays out the view model using the style sheet, layout algorithms, and device constraints.

If the Client Browser 812 is a subset of the server-side browser engine, then the DOM tree and view tree are compressed into a stream 809 and sent through the Server Session module 804 to the Client Browser 812 via the Client Session module 811. The Client Browser 812 decodes the stream, translates the DOM tree and view tree, and displays the page to the user.

Otherwise, the Web page Manager 802 performs the first layout pass and lays out all of the views of the page. The Web page Manager 802 then makes a second pass to determine the visual content on the page. Visual content and positional information are highly compressed and formatted into a stream 809 and forwarded to the Server Session module 804. The Server Session module 804 sends the stream to the Client Browser 812 via the Client Session module 811. The Client Browser 812 decodes the stream and displays the page to the user using the visual content and positional information.

The DOM tree and view tree and all state information (including Javascripts and cookies) for the client are stored on the storage device 807 by the Web page Manager 802.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for providing a server-based Web browser that interacts with a plurality of client device types, comprising the steps of:
   (a) providing browsing means on a server for accepting a Web page from a Web server, said browsing means comprising Web page layout means for laying out said Web page in a two-dimensional virtual page, said Web page layout means determining what information is visible on said virtual page, said Web page layout means determining exact position of each content element within said Web page, and said browsing means creating a compressed stream containing said visible information and the position information of each of said content elements;
   (b) providing client browsing means on a client system for accepting a compressed stream representing display pages, said stream comprising at least text and images found in said web page and position information for each content element found in said web page, wherein said text is accumulated into a string on said server and sent to said client in compressed form; and
   (c) providing means on said server for sending said compressed stream to said client browsing means;
   wherein said client browsing means decompresses said compressed stream and displays said visible information using said position information.

2. The process of claim 1, wherein said browsing means comprises:
   a database of style sheets on a storage device for supported client devices;
   a database of layout algorithms on said storage device for supported client devices; and
   a database of device constraint information on said storage device for said supported client devices;
   wherein said Web page layout means retrieves a style sheet, layout algorithms, and device constraints from said storage device for said supported client system; and
   wherein said Web page layout means lays out said Web page based on said supported client system's style sheet, layout algorithms, and device constraints.

3. The process of claim 1, wherein said step of providing browsing means further comprises the sub-steps of:
   parsing said Web page's HTML code to create a Document Object Model (DOM) tree;
   creating a view tree using said DOM tree; and
   storing said DOM tree and said view tree on a storage device for said client system.

4. The process of claim 3, wherein said client browsing means accepts a URL from a user or determines a position or hotspot ID of the user's click or press on one or more of said display pages, wherein said client browsing means sends said URL, said position, or said hotspot ID to said browsing means, and wherein said browsing means accepts said URL, said position, or said hotspot ID from said client browsing means.

5. The process of claim 4, wherein said step of providing browsing means further comprises the sub-steps of:
   retrieving a DOM tree and view tree from said storage device for said client system;
   determining a location of said position or hotspot ID on said Web page using said view tree;
   finding a script or URL associated with the location using said DOM tree;
   wherein if said script is associated with the location then executing the script and determining the resulting URL; and
   requesting the Web page associated with said resulting URL or said associated URL from the appropriate server.

6. The process of claim 3, wherein said step of providing browsing means further comprises the sub-step of:
   saving said client system's state information on said storage device for a particular user;
   wherein said client system's state information includes Javascripts and cookies; and
   wherein said client system's state information allows said browsing means to track the current state of said client system and the particular user.

7. A process for providing a cross platform Web browser that interacts with a plurality of client device types, comprising the steps of:
   (a) providing browsing means on a server for accepting a Web page from a Web server;
   said step of providing browsing means further comprising the sub-steps of:
      parsing said Web page's HTML code to create a Document Object Model (DOM) tree;
      creating a view tree using said DOM tree;
      providing Web page layout means for laying out said Web page in a two-dimensional virtual page;
      wherein said Web page layout means determines what information is visible on said virtual page;
      wherein said Web page layout means determines exact position of each content element within said Web page;
      wherein said Web page layout means removes unnecessary structural information and retains visible information in said view tree; and
      storing said DOM tree and said view tree on a storage device for said client system;
      wherein said browsing means creates a compressed stream containing said DOM tree, said view tree and position information for each content element found in said web page;
   (b) providing client browsing means on a client system for accepting said compressed streams; and
   (c) providing means on said server for sending said compressed stream to said client browsing means;
   wherein said client browsing means decompresses said compressed stream and displays said visible information using said DOM tree, said view tree and said position information.

8. The process of claim 7, wherein said browsing means comprises:
   a database of style sheets on said storage device for supported client devices;
   a database of layout algorithms on said storage device for said supported client devices; and a database of device constraint information on said storage device for said supported client devices;
wherein said Web page layout means retrieves a style sheet, layout algorithms, and device constraints from said storage device for said client system; and
wherein said Web page layout means lays out said Web page based on said client system's style sheet, layout algorithms, and device constraints.

9. The process of claim 7, wherein said client browsing means accepts a URL from a user or determines a position or hotspot ID of the click or press on one or more of said display pages, wherein said client browsing means sends said URL, said position, or said hotspot ID to said browsing means, and wherein said browsing means accepts said URL, said position, or said hotspot ID from said client browsing means.

10. The process of claim 9, wherein said step of providing browsing means further comprises the sub-steps of:
retrieving a DOM tree and view tree from said storage device for said client system;
determining a location of said position or hotspot ID on said Web page using said view tree; and
finding a script or URL associated with the location using said DOM tree;
wherein if the script is associated with the location then executing the script and determining the resulting URL; and
requesting the Web page associated with said resulting URL or said associated URL from the appropriate server.

11. The process of claim 7, wherein said step of providing browsing means further comprising the sub-step of:
saving said client system's state information on said storage device for a particular user;
wherein said client system's state information includes Javascripts and cookies; and
wherein said client system's state information allows said browsing means to track the current state of said client system and the particular user.

12. An apparatus for a server-based Web browser that interacts with a plurality of client device types, comprising:
(a) browsing means on a server for accepting a Web page from a Web server, said browsing means further comprising Web page layout means for laying out said Web page in a two-dimensional virtual page, said Web page layout means determining what information is visible on said virtual page, and said Web page layout means determining exact position of each content element within said Web page;
wherein said browsing means creates a compressed stream containing said visible information and said position information;
(b) client browsing means on a client system for accepting a compressed stream representing display pages said compressed stream comprising at least text and images found in said web page and said position information, wherein said text and position information is accumulated into a string on said server and sent to said client in compressed form; and
(c) means on said server for sending said compressed stream to said client browsing means;
wherein said client browsing means decompresses said compressed stream and displays said visible information using said position information.

13. The apparatus of claim 12, wherein said browsing means further comprises:
a database of style sheets on a storage device for supported client devices;
a database of layout algorithms on said storage device for supported client devices; and
a database of device constraint information on said storage device for supported client devices;
wherein said Web page layout means retrieves a style sheet, layout algorithms, and device constraints from said storage device for said supported client system; and
wherein said Web page layout means lays out said Web page based on said supported client system's style sheet, layout algorithms, and device constraints.

14. The apparatus of claim 12, wherein said browsing means further comprises:
a module for parsing said Web page's HTML code to create a Document Object Model (DOM) tree;
a module for creating a view tree using said DOM tree; and
a module for storing said DOM tree and said view tree on a storage device for said client system.

15. The apparatus of claim 14, wherein said client browsing means accepts a URL from a user or determines a position or hotspot ID of a user's click or press on one or more of said display pages, wherein said client browsing means sends said URLI said position, or said hotspot ID to said browsing means, and wherein said browsing means accepts said URL, said position, or said hotspot ID from said client browsing means.

16. The apparatus of claim 15, wherein said browsing means further comprises:
a module for retrieving a DOM tree and view tree from said storage device for said client system;
a module for determining the location of said position or hotspot ID on said Web page using said view tree;
a module for finding a script or URL associated with the location using said DOM tree;
wherein if a script is associated with the location then executing the script and determining the resulting URL; and
a module for requesting the Web page associated with said resulting URL or said associated URL from the appropriate server.

17. The apparatus of claim 14, wherein said browsing means further comprises:
a module for saving said client system's state information on said storage device for a particular user;
wherein said client system's state information includes Javascripts and cookies; and
wherein said client system's state information allows said browsing means to track the current state of said client system and the particular user.

18. An apparatus for a cross platform Web browser that interacts with a plurality of client device types, comprising:
(a) browsing means on a server for accepting a Web page from a Web server;
said browsing means further comprising:
a module for parsing said Web page's HTML code to create a Document Object Model (DOM) tree;
a module for creating a view tree using said DOM tree;
Web page layout means for laying out said Web page in a two-dimensional virtual page;
wherein said Web page layout means determines what information is visible on said virtual page;
wherein said Web page layout means determines exact position of each content element within said Web page;
wherein said Web page layout means removes unnecessary structural information and retains visible information in said view tree; and a module for storing said DOM tree and said view tree on a storage device for said client system;

wherein said browsing means creates a compressed stream containing said DOM tree, said view tree and position information for each content element found in said web page;

(b) client browsing means on a client system for accepting said compressed streams;

(c) means on said server for sending said compressed stream to said client browsing means; and wherein said client browsing means decompresses said compressed stream and displays said visible information using said DOM tree, said view tree and said position information.

19. The apparatus of claim 18, wherein said browsing means further comprises:

a database of style sheets on said storage device for supported client devices;

a database of layout algorithms on said storage device for supported client devices;

a database of device constraint information on said storage device for said supported client devices;

wherein said Web page layout means retrieves a style sheet, layout algorithms, and device constraints from said storage device for said client system; and wherein said Web page layout means lays out said Web page based on said client system's style sheet, layout algorithms, and device constraints.

20. The apparatus of claim 18, wherein said client browsing means accepts a URL from a user or determines a position or hotspot ID of a user's click or press on one or more of said display pages, wherein said client browsing means sends said URL, said position, or said hotspot ID to said browsing means, and wherein said browsing means accepts said URL, said position, or said hotspot ID from said client browsing means.

21. The apparatus of claim 20, wherein said browsing means further comprises:

a module for retrieving a DOM tree and view tree from said storage device for said client system;

a module for determining the location of said position or hotspot ID on said Web page using said view tree;

a module for finding a script or URL associated with the location using said DOM tree;

wherein if a script is associated with the location then executing the script and determining the resulting URL; and a module for requesting the Web page associated with said resulting URL or said associated URL from the appropriate server.

22. The apparatus of claim 18, wherein said browsing means further comprises:

a module for saving said client system's state information on said storage device for a particular user;

wherein said client system's state information includes Javascripts and cookies; and wherein said client system's state information allows said browsing means to track the current state of said client system and the particular user.

23. A program storage medium readable by a computer, tangibly embodying a program of instructions executable by the computer to perform method steps for a server-based Web browser that interacts with a plurality of client device types, comprising the steps of:

(a) providing browsing means on a server for accepting a Web page from a Web server, said browsing means providing Web page layout means for laying out said Web page in a two-dimensional virtual page, said Web page layout means determining what information is visible on said virtual page, said Web page layout means determining exact position of each content element within said Web page; and said browsing means creating a compressed stream containing said visible information and the position information;

(b) providing client browsing means on a client system for accepting a compressed stream representing display pages said compressed stream comprising at least text and images found in said web page and said position information, wherein said text is accumulated into a string on said server and sent to said client in compressed form; and (c) providing means on said server for sending said compressed stream to said client browsing means;

wherein said client browsing means decompresses said compressed stream and displays said visible information using said position information.

24. The program storage medium of claim 23, wherein said browsing means comprises:

a database of style sheets on a storage device for supported client devices;

a database of layout algorithms on said storage device for supported client devices; and a database of device constraint information on said storage device for supported client devices;

wherein said Web page layout means retrieves a style sheet, layout algorithms, and device constraints from said storage device for said supported client system; and wherein said Web page layout means lays out said Web page based on said supported client system's style sheet, layout algorithms, and device constraints.

25. The program storage medium of claim 23, wherein said step of providing browsing means further comprising the sub-steps of:

parsing said Web page's HTML code to create a Document Object Model (DOM) tree;

creating a view tree using said DOM tree; and storing said DOM tree and said view tree on a storage device for said client system.

26. The program storage medium of claim 25, wherein said client browsing means accepts a URL from a user or determines a position or hotspot ID of the user's click or press on one or more of said display page, wherein said client browsing means sends said URL, said position, or said hotspot ID to said browsing means, and wherein said browsing means accepts said URL, said position, or said hotspot ID from said client browsing means.

27. The program storage medium of claim 26, wherein said step of providing browsing means further comprising the sub-steps of:

retrieving a DOM tree and view tree from said storage device for said client system;

determining the location of said position or hotspot ID on said Web page using said view tree;

finding a script or URL associated with the location using said DOM tree;

wherein if a script is associated with the location then executing the script and determining the resulting URL; and requesting the Web page associated with said resulting URL or said associated URL from the appropriate server.

28. The program storage medium of claim 23, wherein said step of providing browsing means further comprising the step of:
    saving said client system's state information on said storage device for a particular user;
    wherein said client system's state information includes Javascripts and cookies; and
    wherein said client system's state information allows said browsing means to track the current state of said client system and the particular user.

29. A program storage medium readable by a computer, tangibly embodying a program of instructions executable by the computer to perform method steps for a cross platform Web browser that interacts with a plurality of client device types, comprising the steps of:
    (a) providing browsing means on a server for accepting a Web page from a Web server;
    said step of providing browsing means further comprising the sub-steps of:
        parsing said Web page's HTML code to create a Document Object Model (DOM) tree;
        creating a view tree using said DOM tree;
        providing Web page layout means for laying out said Web page in a two-dimensional virtual page;
        wherein said Web page layout means determines what information is visible on said virtual page;
        wherein said Web page layout means determines exact position of each content element within said Web page;
        wherein said Web page layout means removes unnecessary structural information and retains visible information in said view tree; and
        storing said DOM tree and said view tree on a storage device for said client system;
    wherein said browsing means creates a compressed stream containing said DOM tree, said view tree and position information for each content element found in said web page;
    (b) providing client browsing means on a client system for accepting said compressed streams; and
    (c) providing means on said server for sending said compressed stream to said client browsing means;
    wherein said client browsing means decompresses said compressed stream and displays said visible information using said DOM tree, said view tree and said position information.

30. The program storage medium of claim 29, wherein said browsing means comprises:
    a database of style sheets on said storage device for supported client devices;
    a database of layout algorithms on said storage device for said supported client devices; and
    a database of device constraint information on said storage device for said supported client devices;
    wherein said Web page layout means retrieves a style sheet, layout algorithms, and device constraints from said storage device for said client system; and
    wherein said Web page layout means lays out said Web page based on said client system's style sheet, layout algorithms, and device constraints.

31. The program storage medium of claim 29, wherein said client browsing means accepts a URL from a user or determines a position or hotspot ID of a user's click or press on one of more of said display pages, wherein said client browsing means sends said URL, said position, or said hotspot ID to said browsing means, and wherein said browsing means accepts said URL, said position, or said hotspot ID from said client browsing means.

32. The program storage medium of claim 31, wherein said step of providing browsing means further comprising the steps of:
    retrieving a DOM tree and view tree from said storage device for said client system;
    determining the location of said position or hotspot ID on said Web page using said view tree;
    finding a script or URL associated with the location using said DOM tree;
    wherein if a script is associated with the location then executing the script and determining the resulting URL; and
    requesting the Web page associated with said resulting URL or said associated URL from the appropriate server.

33. The program storage medium of claim 29, wherein said step of providing browsing means further comprises the sub-step of:
    saving said client system's state information on said storage device for a particular user;
    wherein said client system's state information includes Javascripts and cookies; and
    wherein said client system's state information allows said browsing means to track the current state of said client system and the particular user.

* * * * *

UNITED STATES PATENT AND TRADEMARK OFFICE
CERTIFICATE OF CORRECTION

| | | |
|---|---|---|
| PATENT NO. | : 7,587,669 B2 | Page 1 of 1 |
| APPLICATION NO. | : 10/474300 | |
| DATED | : September 8, 2009 | |
| INVENTOR(S) | : Ahad Rana | |

It is certified that error appears in the above-identified patent and that said Letters Patent is hereby corrected as shown below:

ADD TO TITLE PAGE: --Related U.S. Application Data
(60) Provisional Application No. 60/282,194, filed on April 09, 2001.--

Col. 1
INSERT IMMEDIATELY AFTER THE TITLE OF THE SPECIFICATION:
--This application is a National Stage of International Application No. PCT/US02/11420, filed April 09, 2002, which in turn, claims priority to U.S. Provisional patent application serial no. 60/282,194, filed April 09, 2001.--

Signed and Sealed this
Twenty-sixth Day of July, 2011

David J. Kappos
*Director of the United States Patent and Trademark Office*